United States Patent [19]
Bräuer et al.

[11] Patent Number: 5,979,307
[45] Date of Patent: Nov. 9, 1999

[54] DOUBLE-BELT SYSTEM FOR PROCESSING VISCOUS MELTS

[75] Inventors: Stefan Bräuer, Weinstadt; Werner Huber, Waiblingen; Klaus Schäfer, Schorndorf, all of Germany

[73] Assignee: Santrade Ltd., Luzern, Switzerland

[21] Appl. No.: 09/062,397

[22] Filed: Apr. 20, 1998

[30] Foreign Application Priority Data

Apr. 18, 1997 [DE] Germany ............................ 197 16 297

[51] Int. Cl.⁶ ..................................................... B30B 5/06
[52] U.S. Cl. ........................... 100/308; 100/310; 100/154; 100/917; 156/555; 156/583.5; 164/432; 164/502; 425/3; 425/371; 425/DIG. 33
[58] Field of Search ...................................... 100/151, 154, 100/306–314, 917; 156/555, 583.5; 164/431, 432, 481, 502; 425/3, 371, DIG. 33

[56] References Cited

U.S. PATENT DOCUMENTS

| | | | |
|---|---|---|---|
| 602,929 | 4/1898 | Anderson | 100/154 |
| 2,137,505 | 11/1938 | Osgood | 100/154 |
| 2,640,235 | 6/1953 | Hazelett | 164/481 |
| 2,675,053 | 4/1954 | Clemens | 100/151 |
| 3,041,686 | 7/1962 | Hazelett et al. | 164/481 |
| 3,142,873 | 8/1964 | Hazelett et al. | 164/432 |
| 3,648,598 | 3/1972 | Kawada | 100/154 |
| 3,844,133 | 10/1974 | Bierley et al. | 100/306 |
| 3,860,368 | 1/1975 | Kerttula et al. | 100/917 |
| 3,994,648 | 11/1976 | Kornylak et al. | 425/371 |
| 4,202,721 | 5/1980 | Roberts | 100/306 |
| 4,643,412 | 2/1987 | Heina et al. . | |
| 4,674,558 | 6/1987 | Hazelett et al. | 164/481 |
| 4,799,424 | 1/1989 | Stabler | 100/311 |

FOREIGN PATENT DOCUMENTS

| | | | |
|---|---|---|---|
| 1281879 | 12/1961 | France | 100/917 |
| 15 56 183 | 1/1970 | Germany . | |
| 195 05 084 | 8/1996 | Germany . | |

*Primary Examiner*—Stephen F. Gerrity
*Attorney, Agent, or Firm*—Burns, Doane, Swecker & Mathis, L.L.P.

[57] ABSTRACT

A double-belt system for processing viscous melts includes a driven upper belt having a lower working run, and a driven lower belt having an upper working run spaced beneath the lower working run to form a gap therewith for receiving a viscous melt. A gap-adjusting mechanism includes upper rollers engaging an upper surface of the lower working run, and lower rollers engaging a lower surface of the upper working run. A distance between the upper rollers and lower rollers is adjustable to vary a size of the gap. A compensation mechanism is disposed over the lower working run to apply an upward force thereto for pulling the lower working run against the upper rollers, thereby resisting sagging of the lower working run. At least one delivery mechanism applies a temperature-controlled liquid across an entire width of the lower working run for controlling a temperature thereof. The liquid is extracted by an extraction mechanism disposed downstream of the delivery mechanism. Vertically adjustable stops are provided for determining a vertical position of respective ones of the upper rollers.

13 Claims, 5 Drawing Sheets

DOUBLE-BELT SYSTEM FOR PROCESSING VISCOUS MELTS

BACKGROUND OF THE INVENTION

The invention relates to a double-belt system having continuously recirculating upper and lower belts, the mutually facing working runs of the belts delimiting a process gap, the height of the process gap being adjustable by means of calibration rollers which are associated with the working runs of the belts.

Double-belt systems for processing viscous melts into plastics in slab form are commonly known. A double-belt system has a continuously recirculating upper belt as well as a continuously recirculating lower belt, the mutually facing working runs of which delimit a process gap in which the melt product is cured into the slab form, under defined pressure and temperature conditions, in a continuous flow-through process through the double-belt system. Difficulties have previously been encountered, however, in the processing of, in particular, highly free-flowing (i.e., relatively low-viscosity) melts.

It is the object of the invention to create a double-belt system of the above-described kind which allows improved processing of highly free-flowing melts.

SUMMARY OF THE INVENTION

This object is achieved by the fact that on a back side, facing away from the process gap, of the working run of the upper belt there is provided a plurality of compensation devices, distributed over at least a portion of the length of the process gap and each extending over at least almost the entire width of the working run, which keep the working run positioned flat over the width of the process gap against the dead weight of the working run. The solution according to the invention is based on the recognition that with relatively highly free-flowing, i.e., low-viscosity, melts, the counter pressure of the melt product in the process gap is not sufficient to keep the working run of the upper belt flat. The working run instead sags at least slightly under its own weight, thus calling into question the accuracy of the cured slab products to be produced. The solution according to the invention prevents sagging of the working run over its width, the compensation devices pulling the working run of the upper belt upward against the dead weight of the working run. It is thus possible to produce slab material very accurately, with extremely low tolerances. Since a steel belt, in particular, is used as the upper belt, magnet arrangements, which either are configured in roller fashion and thus roll along the working run as the upper belt circulates, or are equipped with associated sliding elements which allow noncontact action of the magnet arrangements, are particularly suitable as compensation devices. Also suitable as compensation devices are vacuum mechanisms which exert suction on the working run. Vacuum bars can be used with particular advantage. In the same fashion, mechanical means for pulling up the working run and keeping it flat can be used as compensation devices. The solution according to the invention thus allows even relatively highly free-flowing melts to be processed easily and accurately into slab products. The solution according to the invention is particularly suitable for the production of acrylic- or polyester-based synthetic marble. The solution according to the invention is equally well suited for the production of other thermoplastic or thermosetting plastic slabs.

In an embodiment of the invention, at least one magnet element is fastened in each case on a support beam extending over the width of the process gap. In a further embodiment, the at least one magnet element is arranged adjustably as to height relative to the support beam. As a result, the attractive force of the at least one magnet element acting on the working run can be modified by varying the spacing of the magnet element from the working run.

The object on which the invention is based is also achieved in that there are associated with the back side of the working run of the upper belt at least one delivery mechanism and at least one associated extraction mechanism, spaced apart in the belt travel direction, for a liquid temperature-control medium. The delivered mechanism applies the temperature-control medium onto the working run over its entire width, and the extraction mechanism extracts the medium from the working run. In addition to temperature control, known per se, of the working run of the lower belt associated with the process gap, the solution according to the invention also results in precise temperature control of the working run of the upper belt, so that the melt product present in the process gap can be temperature-controlled, over its entire thickness, much more precisely than is possible in the existing art on either single-belt or double-belt systems. The reason is that delivery of the liquid temperature-control medium onto the back side of the working run of the upper belt allows both working runs delimiting the process gap to be temperature-controlled in identical fashion, so that uniform curing—and thus uniform polymerization, reaction, and cooling—are guaranteed over the entire thickness of the melt product. Water is provided, in particular, as the liquid temperature-control medium. If curing of the melt product takes place in multiple zones of the process gap, provision can also be made for delivery and extraction of the liquid temperature-control medium only in the region of an individual zone. Simultaneous application and extraction of the temperature-control medium over the entire width of the process gap also allows correspondingly uniform temperature control over the width of the melt product.

In a further embodiment of the invention, one delivery mechanism and one associated extraction mechanism are arranged before and after each calibration roller in the belt travel direction. This makes possible a relatively precise temperature control of the working run, since with multiple calibration rollers and respectively associated delivery and extraction mechanisms, new temperature-control medium (in particular water), controlled to a defined temperature, can be applied in each case onto the working run.

In a further embodiment of the invention, the calibration rollers positioned between the delivery and extraction mechanisms are equipped with multiple circumferential contours distributed over the width of the process gap and oriented in the belt travel direction. These circumferential contours guarantee that the liquid temperature-control medium, in particular water, is guided in the belt travel direction, in essentially unhindered fashion between the calibration rollers and the back side of the working run, to the respective extraction mechanism.

The object on which the invention is based is also achieved by the fact that at least one adjustable positioning stop, for establishing a defined process gap height, is associated with each calibration roller. Precise adjustability of the process gap height also allows precise control over the chemical reactions which occur during curing of the melt product.

BRIEF DESCRIPTION OF THE DRAWING

Further advantages and features of the invention are evident from the dependent claims and from the description below of a preferred exemplifying embodiment of the invention, which is presented with reference to the drawings.

DETAILED DESCRIPTION OF A PREFERRED EMBODIMENT

Figure 1:
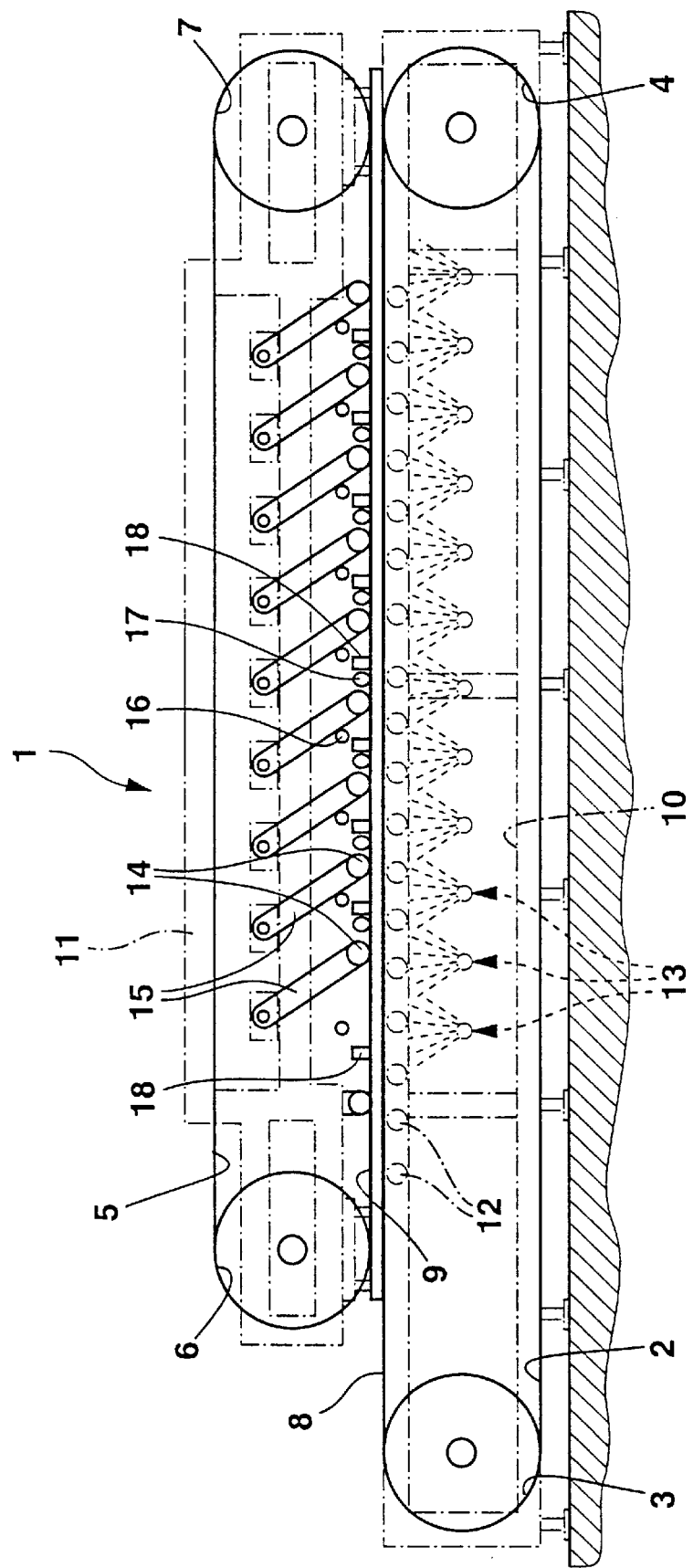
FIG. 1 schematically shows, in a side view, an embodiment of a double-belt system according to the invention which is divided into multiple temperature-control zones over the length of the process gap.

As shown in FIG. 1, a double-belt system 1 according to FIGS. 1–7 has a continuously circulating lower belt 2, in the form of a steel belt, which is laid around an infeed drum 3 and an outfeed drum 4. Infeed drum 3 and outfeed drum 4 are mounted in a stable lower frame 10 of double-belt system 1. Arranged on lower frame 10 is an upper frame 11, associated with which is a continuously circulating upper belt 5 also configured as a steel belt. Upper belt 5 runs on the infeed side over an infeed drum 6, and on the outfeed side over an outfeed drum 7, each of which is mounted in upper frame 11. Infeed drum 6 is set back in the belt travel direction with respect to infeed drum 3 of lower belt 2, whereas the two outfeed drums 4 and 7 are arranged one above the other. An upper working run 8 of lower belt 2 and a lower working run 9 of upper belt 5 delimit the top and bottom of a process gap through which a melt product to be treated runs. The melt runs in the belt travel direction, from an infeed region to an outfeed region located at the outfeed drums 4, 7.

The process gap is divided, in the belt travel direction, into multiple zones so as to obtain cured slab material from a low-viscosity melt product. The depicted double-belt system 1 serves in particular for the continuous production of synthetic marble, the melt of which is delivered at very low viscosity to the infeed region of double-belt system 1. To prevent the low-viscosity melt from flowing laterally out of the process gap constituted by the mutually facing working runs 8, 9, lateral delimiting strips or dams 23 are provided which pass through the process gap together with the melt product.

The process gap is divided, in the belt travel direction, into two mutually adjoining regions; in a first region, the melt material is still very low in viscosity and cannot handle any stresses. Thermal reactions or polymerization have not yet begun in this region. In the second region of the process gap, consolidation of the melt material takes place, in particular by means of an exothermic reaction. Consolidation of the melt material, present in manometric form, occurs in the course of the overall process within double-belt system 1 by means of polymerization. The process protocol requires multiple temperature-control zones, preheating occurring in a first zone. The exothermic reaction takes place in a second zone. In a third zone used for post-processing, the temperature is raised again so as additionally to polymerize out any residual monomers. The last zone represents a cool-down zone.

To prevent the low-viscosity melt material, which in the case of the exemplifying embodiment described is an MMA compound, from flowing out forward or backward along the belt direction, there are also provided, in addition to the lateral flow delimiters described, longitudinal flow delimiters running transversely to the belt travel direction, which, like the lateral flow delimiters, also pass through the process gap together with the melt material. Both the lateral flow delimiting strips and the longitudinal flow delimiters must be designed, in terms of thermal and mechanical stress, for the melt material and for the particular requirements in the process gap.

Figure 2:
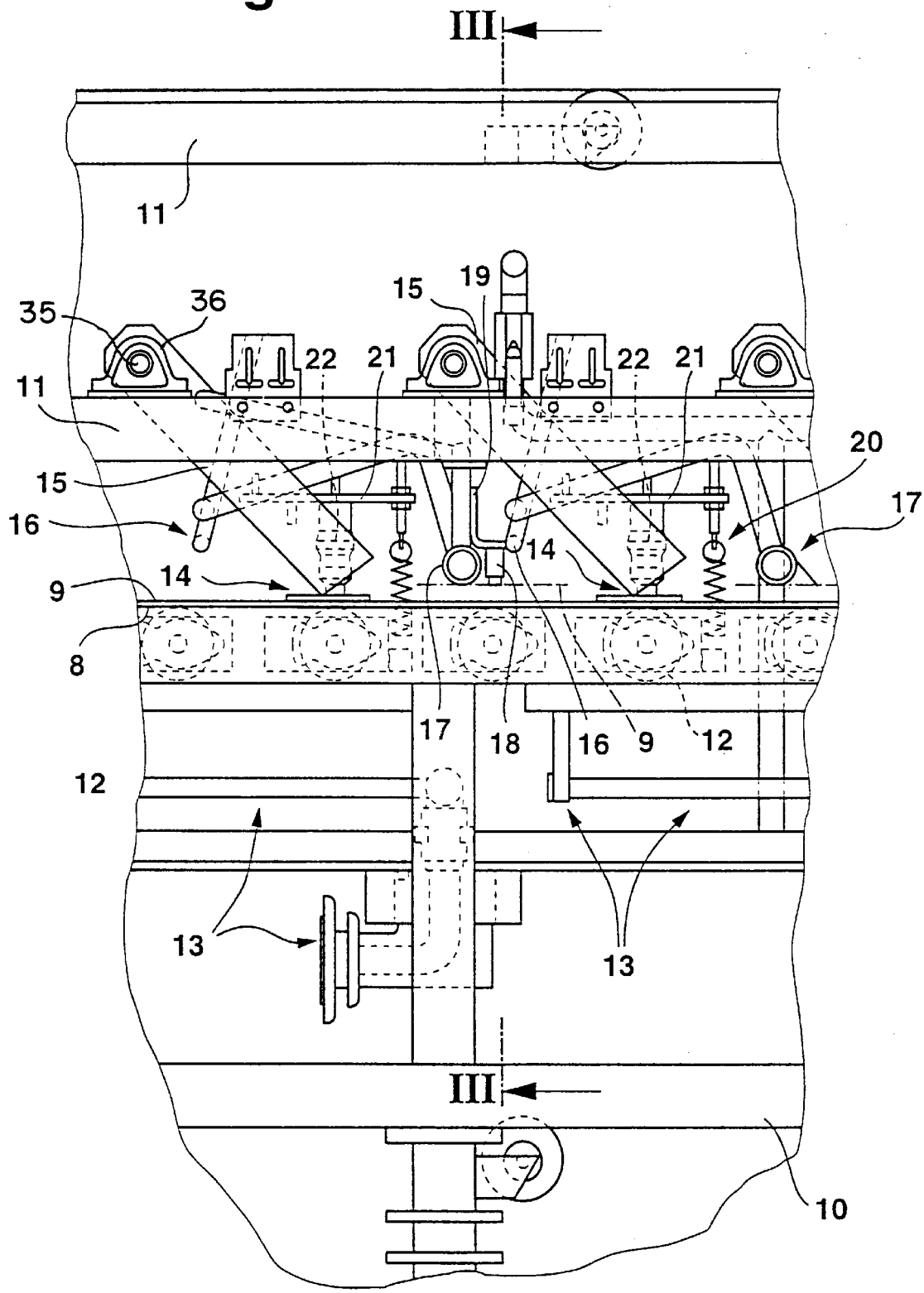
FIG. 2 shows, in an enlarged representation, a portion of the double-belt system according to FIG. 1 in the region of delivery and extraction mechanisms for temperature-controlled water, a compensation device in the form of a magnet beam being additionally shown.
Figure 3:
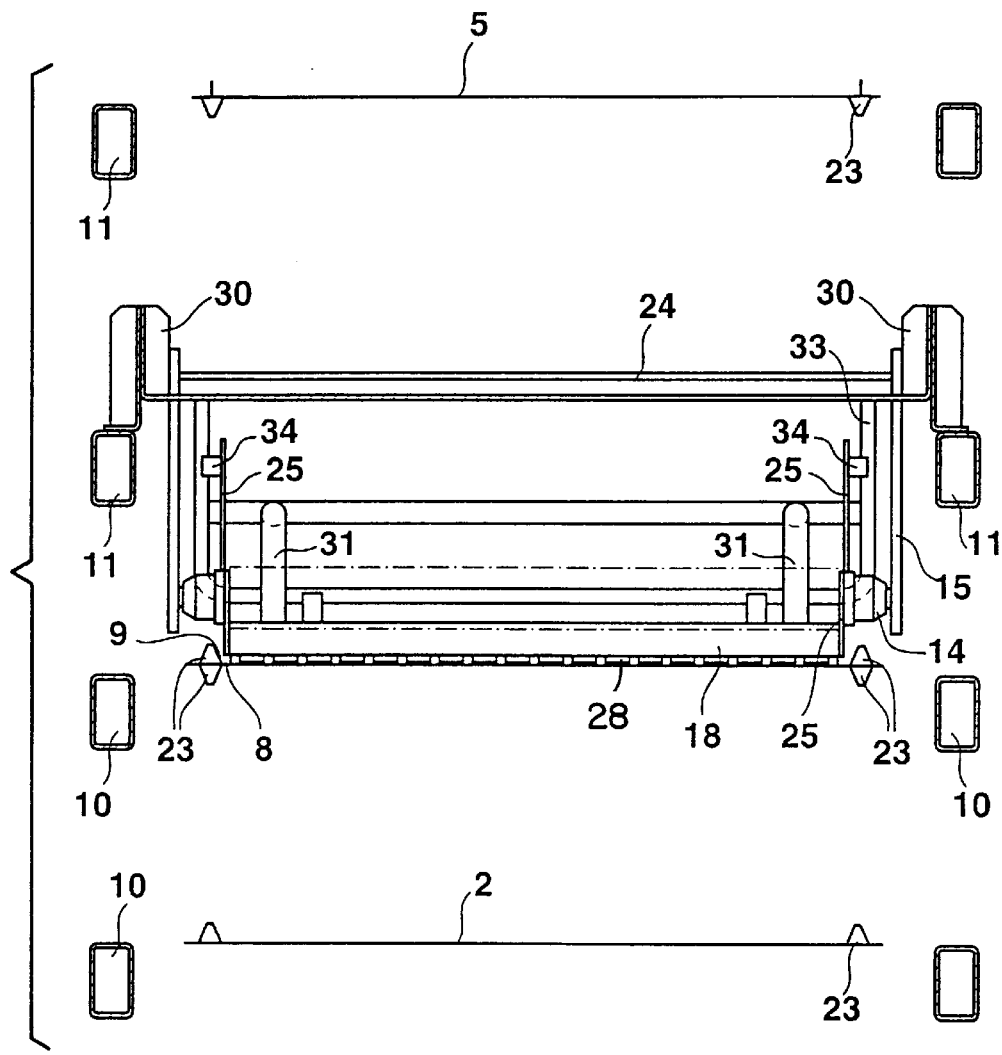
FIG. 3 shows a cross section through the double-belt system according to FIGS. 1 and 2, at the level of section line III–III in FIG. 2.
Figure 4:
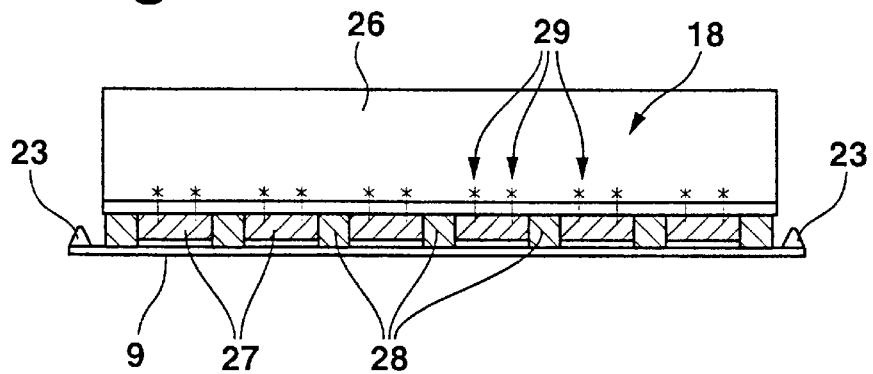
FIG. 4 shows, in a schematic and enlarged sectional representation which is not to scale, the magnet beam according to FIGS. 2 and 3.

In order to be able to adjust the height of the process gap relatively accurately over its length, a plurality of calibration rollers 12, 14, arranged at regular spacings one behind another, are associated with working run 8 and with working run 9, respectively. The arrangement of calibration rollers 12 and 14 is shown only schematically in FIG. 1, and does not correspond to actual conditions. As disclosed by the preferred practical embodiment of a double-belt system 1 as shown in FIG. 2, calibration rollers 12 which are arranged at regular intervals over the entire length of the process gap are associated with lower working run 8. Calibration rollers 12 are arranged below working run 8 and extend transversely to the belt travel direction, to support working run 8 from below. Calibration rollers 12 are mounted on corresponding longitudinal supports of lower frame 10. Calibration rollers 14 are spaced from one another by double the spacing between calibration rollers 12, each calibration roller 14 (FIGS. 2, 7) being mounted parallel to the lower calibration rollers 12 between two rotatable arms 15. The arms 15 extend in the belt travel direction and obliquely downward from a pivot shaft 35 to define a pivoting yoke together with the arms 15 (see FIG. 7). Pivot shaft 35 extends parallel to the rotation axis of the associated calibration rollers 14, and is mounted on lateral, mutually opposite longitudinal supports of upper frame 11 by means of bearing brackets 36. As is evident from FIG. 2, calibration rollers 14 are each arranged above a corresponding lower calibration roller 12, so that they constitute, with said lower calibration rollers 12, pressure roller pairs for pressure loading of the process gap. Pressure loading of the process gap by means of calibration rollers 14 will be discussed in more detail below.

In order to effect a temperature control to provide a uniform temperature from top to bottom of the melt material in the process gap, in accordance with the intended process protocol, both the associated working run 9 of upper belt 5 and the corresponding working run 8 of lower belt 2 are temperature-controlled. Water is used as the temperature-control medium, the water being sprayed onto an underside of lower working run 8 through spray devices 13 which have a plurality of spray nozzles arranged at regular spacings over the length of the process gap below working run 8. The temperature-controlled water is applied to and extracted from the back side, facing away from the process gap, of upper working run 9 via a plurality of delivery and extraction mechanisms 16, 17, each delivery mechanism 16 also having associated with it a downstream extraction mechanism 17 which is dimensioned such that all the water applied through delivery mechanism 16 onto the back side of working run 9 can be extracted. To prevent the applied water from escaping laterally via the edges of working run 9, the back side of upper belt 5 has lateral flow delimiters or dams 23 in the region of the opposing lateral edges.

Figure 7:
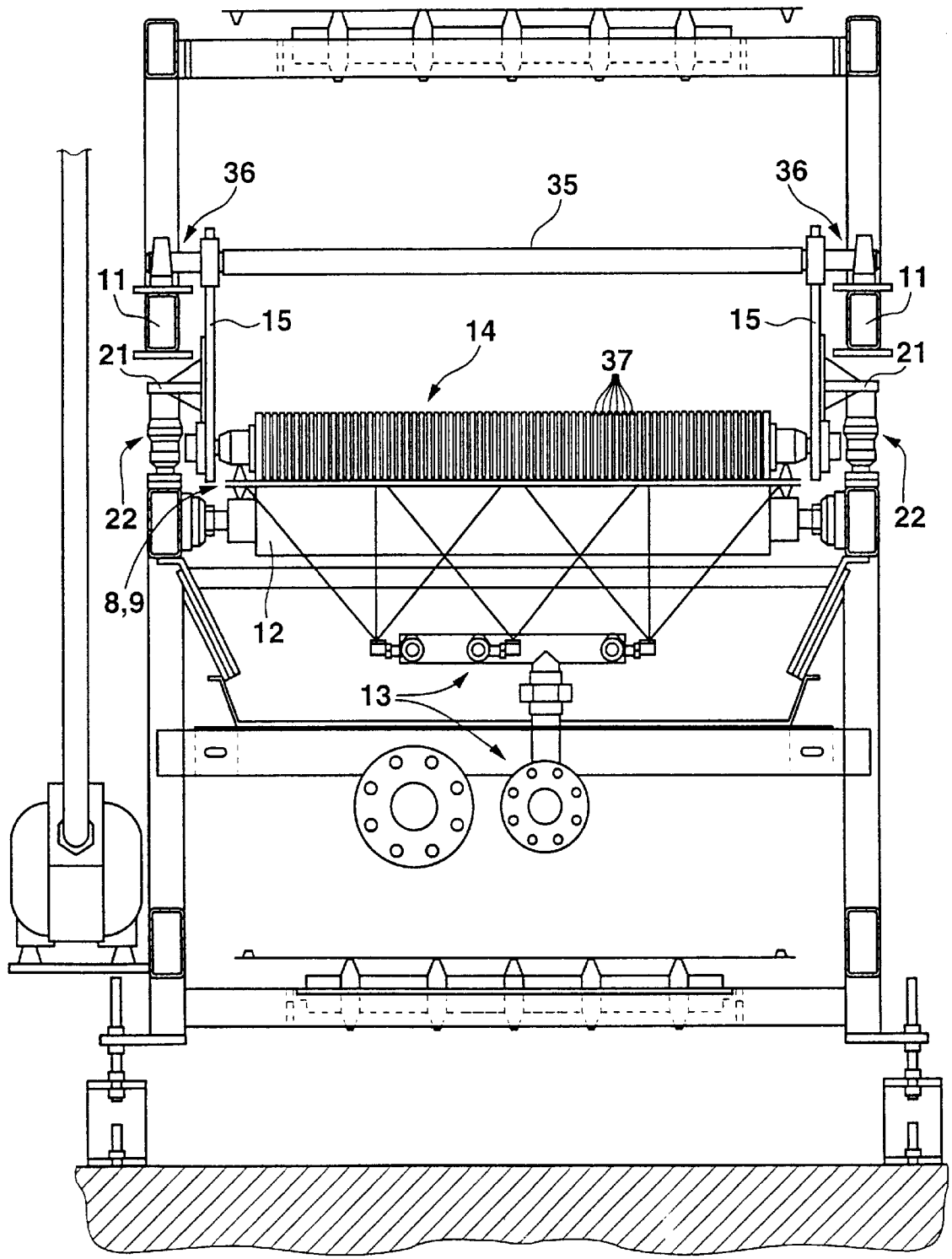
FIG. 7 shows, in an enlarged representation, a cross section through the double-belt system according to FIGS. 1 to 6, the fluted longitudinal contour of the calibration rollers of the upper belt being visible.

Delivery and extraction mechanisms 16, 17 are associated with working run 9 in the zones of the process gap in accordance with the need for corresponding temperature control, i.e., heating or cooling, of the product in the process gap. In the illustrated exemplifying example, a delivery mechanism 16 is provided in front of each calibration roller 14 (viewed in the belt travel direction), and a corresponding extraction mechanism 17 is provided behind the respective calibration roller 14. With other preferred embodiments of the invention, however, a smaller number of delivery and extraction mechanisms may be provided, limited to only one or two temperature-control zones. Because of the good thermal conductivity of the steel belt, temperature control of the back side of upper belt 5 makes possible a corresponding temperature control of the process gap. In order to prevent the particular calibration roller 14 resting on the back side of working run 9 from blocking water flow along with the circulation of working run 9, each calibration roller 14 is equipped over its entire axial length with axially spaced circumferential contours 37 or grooves (FIG. 7). These grooves 37 allow water to be guided beneath the respective calibration roller 14 without influencing its function of pressing onto working run 9. Delivery mechanism 16 has a nozzle bar (not further designated), extending over the width of working run 9, through which the temperature-controlled water is delivered, simultaneously over the entire width of the process gap, onto the back side of working run 9.

The nozzle bar, extending transverse to the belt travel direction, is held on a carrier yoke 33 which is immovably joined, via retaining blocks 30, to the longitudinal supports of upper frame 11. In order to strengthen the attachment of carrier yoke 33 to retaining blocks 30, each carrier yoke 33 is attached to a cross member 24 which in turn is immovably joined to retaining blocks 30.

Water delivery to the nozzle bar is accomplished, in a manner not shown in further detail, by means of a corresponding pipe system into which a pressure pump is incorporated.

Each extraction mechanism 17 has a suction bar, resting on the surface of the back side of working run 9, and which extends over the width of working run 9 between the lateral flow delimiters 23. The suction bar extracts water from the surface of working run 9 over the entire width of working run 9 between the lateral flow delimiters 23. The suction bar is in communication with a vacuum pump via a corresponding pipe system. Heating and cooling of the delivered or extracted water is accomplished in a manner known per se, so that no further explanation thereof will be given here.

Each suction bar is retained by means of a pivoting frame 31 which is mounted pivotably on the associated carrier yoke 33 of the corresponding nozzle bar of the delivery mechanism. Corresponding pivot mounting extensions 32 are provided for this purpose on the carrier yoke 33. Each suction bar rests, as a result of the weight of pivoting frame 31 and of the suction bar, on the back side of working run 9. Since each nozzle bar 16 of the delivery mechanism following an extraction mechanism in the belt travel direction is arranged immediately behind one of the suction bars 17, each suction bar has, on the side facing the nozzle bar, an oblique deflector plate 17a which also rests on the back side of working run 9. Said deflector plate prevents the suction bar from drawing in water being applied by the next (downstream) delivery mechanism 16.

Figure 5:
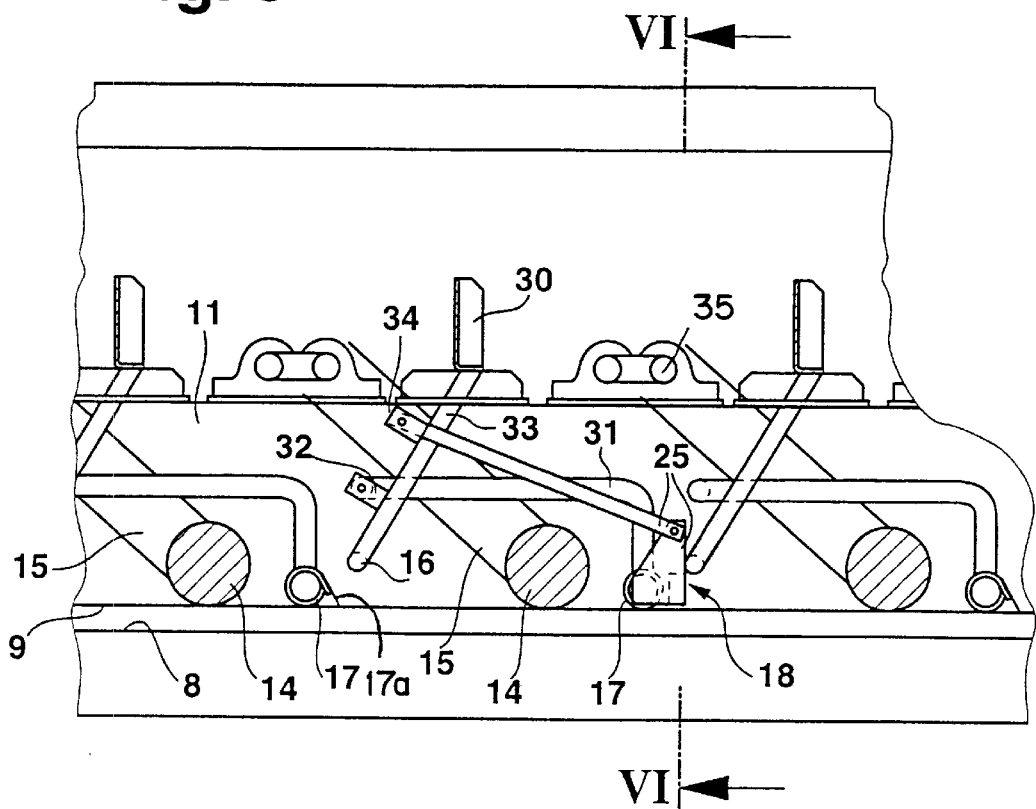
FIG. 5 shows, in a side view, a further portion of the double-belt system according to FIGS. 1 and 2, similar to FIG. 2 but shown in simplified fashion as compared with said FIG. 2.
Figure 6:
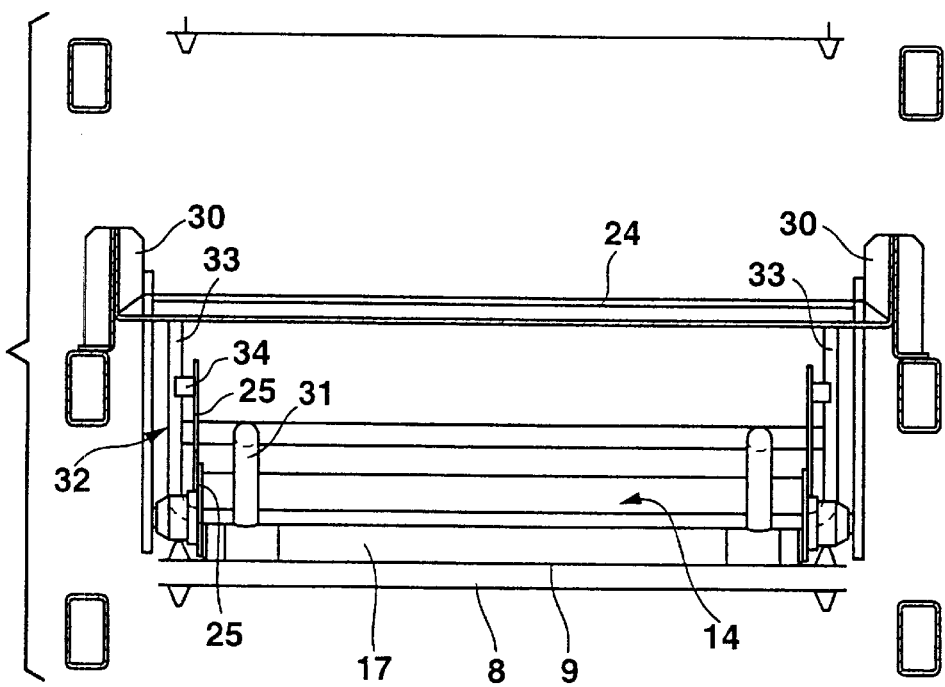
FIG. 6 shows-a section through the double-belt system according to FIG. 5, at the level of section line VI–VI in FIG. 5.

To prevent upper working run 9 from sagging widthwise or lengthwise under its own weight into the process gap, there are associated with working run 9 a plurality of compensation devices 18, described in more detail below, which are spaced apart from one another in the belt travel direction, above the back side of working run 9. Said compensation devices are necessary especially in the regions of the process gap in which the melt material is still of relatively low viscosity, whereby the melt material itself produces no counter pressure which can absorb the forces resulting from the weight of working run 9. Since, however, sagging of working run 9 in those regions in which the melt material is still low in viscosity can cause the melt material, once consolidated into the slab material, to have a curved surface and/or one impaired by thickness tolerances, compensation devices 18 described below are provided. In the case of the exemplifying embodiment shown, each of the compensation devices 18 extends parallel to upper belt 5 in a direction transversely across the width of working run 9. Each compensation device 18 is linear in configuration, and is attached at its opposite ends to lateral retaining brackets of a carrier arrangement 25. Arranged on an underside of the compensation device 18, distributed over the width of the process gap, are a plurality of slider shoes 28 which rest on the surface of the back side of working run 9 (see FIG. 4). Magnet blocks 27, each configured as a permanent magnet, are attached by means of threaded connectors 29 (shown schematically) to the underside of compensation device 18. Each magnet block 27 is sandwiched between two adjacent slider shoes 28. Disposed between each magnet block and the associated underside of compensation device 18, at the height of threaded connectors 29, are respective shim washers (not shown) by means of which the spacing between the underside of each magnet block 27 (facing working run 9) and the back side of working run 9 can be modified. In any case, the vertical thickness of magnet blocks 27 is less than the vertical thickness of the adjacent slider shoes 28, so that magnet blocks 27 are arranged out of contact with the working run 9. The attractive force on working run 9 can be modified as a function of the spacing between magnet blocks 27 and working run 9 that is selected. The magnetic attractive forces of magnet blocks 27 cause working run 9 to be kept, against its own weight, in a flat position in contact against slider shoes 28. Working run 9 thus does not exert any compressive forces as a result of its own weight on the low-viscosity melt material. A support part 26 of each compensating device 18 is articulated, via the carrier arrangement 25, on retaining clips 34 of carrier yoke 33 for the associated delivery mechanism 16. Each compensating device 18 is arranged, in the belt travel direction, directly behind an associated suction bar 17. The retaining brackets of each carrier arrangement 25 additionally overlap the opposing ends of the associated suction bar 17. Carrier arrangement 25 is configured in such a way that together with pivoting frame 31 for the adjacent suction bar 17, a parallelogram linkage results (FIG. 5). As a result, each compensating device 18 can be lifted, together with pivoting frame 31 of the associated suction bar 17, away from the back side of working run 9.

In an exemplifying embodiment of the invention that is not shown, the extraction mechanisms for extracting the water applied onto the working run are designed with sufficient suction power that they can also simultaneously serve as compensation devices to prevent sagging of the working run. Because of the suction effect of the extraction mechanisms, the working run is pulled up, against its own weight, up to the respective extraction mechanism, and thus held in position. This embodiment is particularly suitable for upper belts which are made of a non-magnetizable material, for example stainless steel.

In order to be able to exert pressure on working runs 8, 9, in specific regions of the process gap, tension spring arrangements 20 (FIG. 2) are associated with the lower and upper calibration rollers 12, 14, and are arranged respectively in pairs one above another. Each of the tension spring arrangements 20 is suspended on a fixed articulation point of lower frame 10 and has its opposite spring ends engaged on respective support arms 21 (see FIG. 7). The support arms are rigidly joined to the associated arms 15 of the pivoting frames for the upper calibration rollers 14. Tension spring arrangements 20 are joined adjustably to support arms 21 by means of corresponding screw threads, so that the resulting tensile forces can be modified.

In order additionally to make possible a precise calibration of the process gap irrespective of additional tensile forces, an adjustable stop 22 (see FIG. 7) that is attached to lower frame 10 is additionally associated with each support arm 21. Each stop 22 is configured as a screw-threaded plunger in the form of a micrometer, and has at its upper end a flat, horizontal end surface on which, in the functional position of the stops, a stable contact plate of each associated support arm 21 rests (FIGS. 2 and 7). The contact plunger of each stop 22 is precisely adjustable, in terms of its height relative to lower frame 10 and thus relative to lower working run 8, by means of the screw-threaded micrometer arrangement. The position of the contact plunger of each stop 22 is established by screwing the contact plunger in or out and can be fixed by means of a mechanical locking device. Because each support arm 21, which in the functional position of each stop 22 rests on the associated contact plunger of each stop 22, is joined in rigid and stable fashion to the associated arm 15 of each pivoting yoke, each of which carries a calibration roller 14, it is possible by means of stops 22 to establish precisely the spacing of calibration rollers 14 from lower working run 8, and thus also the height of the process gap. In the functional position of stops 22, the respective associated tension spring arrangement 20 serves exclusively to hold the respective support arm 21 in its position resting on stop 22, and thus to prevent support arm 21, and hence calibration roller 14, from lifting off inadvertently.

In order to produce synthetic marble as a cured slab material in a continuous pass through double-belt system 1, the low-viscosity MMA compound serving as the melt material is first heated to a starting temperature which depends on the particular initiator being used. This starting temperature is preferably approximately 70° C. Heating to approximately 50° C. can first occur relatively quickly, but a dwell time of at least ten minutes at this temperature level is necessary in order to allow polymerization to begin even at a relatively low level. At this relatively low level, all monomers can be incorporated into oligomers. If the temperature is elevated too quickly to the starting temperature, the resulting exothermic reaction might cause the temperature within the melt material to rise too quickly to over 100° C., which would cause bubbling and, as a result, evaporation of monomers. Because of the sensitive temperature-control capabilities of both the lower belt and the upper belt, the desired effect can be achieved, if necessary also by means of cooling. In a post-processing zone, a temperature elevation is then performed once again, to a level which allows even residual monomers to polymerize out. Provided subsequent to this zone is a temperature-control zone which ensures cool-down of the consolidated slab material.

In the regions in which a rapid elevation in viscosity and subsequent consolidation of the melt material occur in the process gap, upper working run 9 can also be kept flat by a continuous decrease in the process gap in the belt travel direction, so that the pressure buildup occurring in the process gap acts on the upper working run and keeps it flat. If this type of continuous decrease in the process gap were also implemented in the front feed-in region of the process gap, the low-viscosity melt material would be pushed out again toward the front. It is thus advantageous to arrange the above-described compensation devices particularly in these front feed-in regions. The low-viscosity melt material is delivered, in a delivery region, onto the lower belt which extends forward in front of the upper belt, and flows out in planar form. The fill level of the melt material in the delivery region before the process gap must be substantially higher than the height of the process gap in order to prevent air inclusions in the later slab material.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A double-belt system for processing a viscous melt, comprising:

a driven upper belt having a lower working run, and a driven lower belt having an upper working run spaced beneath the lower working run to form a gap therewith for receiving viscous melt;

a gap-adjusting mechanism including upper rollers engaging an upper surface of the lower working run, and lower rollers engaging a lower surface of the upper working run, a distance between the upper rollers and lower rollers being adjustable to vary a size of the gap;

a compensation mechanism disposed over the upper surface of the lower working run for applying an upward force thereto to pull the lower working run against the upper rollers and resist sagging of the lower working run;

at least one delivery mechanism for applying a temperature-controlled liquid across an entire width of the upper surface of the lower working run for controlling a temperature thereof; and at least one extraction mechanism disposed downstream of the delivery mechanism for removing the liquid from the upper surface, the at least one extraction mechanism comprising a suction device having a liquid inlet extending transversely across the upper surface.

2. The double-belt system according to claim 1 wherein there is a delivery mechanism and an extraction mechanism disposed upstream and downstream, respectively, of one of the upper rollers.

3. The double-belt system according to claim 2 wherein the one upper roller includes axially spaced, circumferentially extending grooves permitting liquid to travel past the roller.

4. The double-belt system according to claim 1 further including vertically adjustable stops for determining a vertical position of respective ones of the upper rollers.

5. The double-belt system according to claim 4 wherein at least some of the upper and lower rollers are arranged in pairs disposed one above the other, and further including a spring for biasing the rollers of each pair toward one another.

6. The double-belt system according to claim 4 wherein each of the upper rollers has opposite ends mounted on respective rotary arms, the stops being engageable with respective ones of the arms.

7. A double-belt system for processing a viscous melt, comprising:
   a driven upper belt having a lower working run, and a driven lower belt having an upper working run spaced beneath the lower working run to form a gap therewith for receiving viscous melt;
   a gap-adjusting mechanism including upper rollers engaging an upper surface of the lower working run, and lower rollers engaging a lower surface of the upper working run, a distance between the upper rollers and lower rollers being adjustable to vary a size of the gap;
   at least one delivery mechanism for applying a temperature-controlled liquid across essentially an entire width of the upper surface of the lower working run for controlling a temperature thereof; and
   at least one extraction mechanism disposed downstream of the delivery mechanism for removing liquid from the upper surface, the at least one extraction mechanism comprising a suction device having a liquid inlet extending transversely across the upper surface.

8. The double-belt system according to claim 7 wherein a delivery mechanism and an extraction mechanism are disposed upstream and downstream, respectively, of one of the upper rollers.

9. The double-belt system according to claim 8 wherein the one upper roller includes axially spaced, circumferentially extending grooves permitting liquid to travel past the roller.

10. The double-belt system according to claim 7 wherein the lower working run includes longitudinally extending lateral flow dams adjacent each edge thereof for retaining the liquid.

11. A double-belt system for processing a viscous melt, comprising:
   a driven upper belt having a lower working run, and a driven lower belt having an upper working run spaced beneath the lower working run to form a gap therewith for receiving viscous melt, the upper belt formed of a magnetizable material;
   a gap-adjusting mechanism including upper rollers engaging an upper surface of the lower working run, and lower rollers engaging a lower surface of the upper working run, a distance between the upper rollers and lower rollers being adjustable to vary a size of the gap; and
   a compensation mechanism disposed over the upper surface of the lower working run for applying an upward force thereto to pull the lower working run against the upper rollers and resist sagging of the lower working run, the compensating mechanism including a plurality of supporting beams extending across a width of the lower working run in a direction transverse to belt movement, each beam carrying magnets for applying an upward magnetic force to the lower working run.

12. The double-belt system according to claim 11 wherein at least some of the magnets are vertically adjustable relative to the respective support beam.

13. The double-belt system according to claim 11further including at least one slider shoe carried by each of the support beams and engaging the upper surface of the lower working run.

* * * * *